US008538351B2

(12) United States Patent
Wilson et al.

(10) Patent No.: US 8,538,351 B2
(45) Date of Patent: Sep. 17, 2013

(54) RADIATION POWER LEVEL CONTROL SYSTEM AND METHOD FOR A WIRELESS COMMUNICATION DEVICE BASED ON A TRACKED RADIATION HISTORY

(75) Inventors: Kelce Steven Wilson, Irving, TX (US); Shirook M. Ali, Waterloo, CA (US); Shalini Suresh Periyalwar, Waterloo, CA (US); James Earl Womack, Irving, TX (US)

(73) Assignee: BlackBerry Limited, Waterloo (CA)

( * ) Notice: Subject to any disclaimer, the term of this patent is extended or adjusted under 35 U.S.C. 154(b) by 425 days.

(21) Appl. No.: 12/839,622

(22) Filed: Jul. 20, 2010

(65) Prior Publication Data

US 2012/0021800 A1    Jan. 26, 2012

(51) Int. Cl.
*H04B 1/04*    (2006.01)

(52) U.S. Cl.
CPC ........................................ *H04B 1/04* (2013.01)
USPC ........................................ 455/127.1; 455/522

(58) Field of Classification Search
CPC ....................................................... H04B 1/04
USPC ................. 455/68, 69, 422.1, 423, 424, 500, 455/522, 523, 550.1, 575.1, 127.1–127.4
See application file for complete search history.

(56) References Cited

U.S. PATENT DOCUMENTS

| 5,524,275 | A  | 6/1996  | Lindell |
| 7,330,705 | B2 | 2/2008  | Lee |
| 7,609,171 | B2 | 10/2009 | Haapoja et al. |
| 7,610,027 | B2 | 10/2009 | Alapuranen |
| 2005/0113103 | A1 | 5/2005 | Snowden et al. |
| 2005/0113125 | A1* | 5/2005 | Kang ............................ 455/522 |
| 2007/0111681 | A1 | 5/2007 | Alberth, Jr. et al. |
| 2012/0077538 | A1* | 3/2012 | Yun ................................ 455/522 |
| 2012/0190398 | A1* | 7/2012 | Leukkunen .................... 455/522 |
| 2012/0270592 | A1* | 10/2012 | Ngai et al. .................... 455/522 |

FOREIGN PATENT DOCUMENTS

| CA | 2746881   | 1/2012 |
| EP | 0 827 287 | 3/1998 |
| EP | 0 843 421 | 5/1998 |
| EP | 1 248 379 | 10/2002 |
| EP | 1298809   | 4/2003 |

(Continued)

OTHER PUBLICATIONS

David Seabury, "An Update on SAR Standards and the Basic Requirements for SAR Assessment," ETS-Lingren, Apr. 2005, 8 pages.

(Continued)

*Primary Examiner* — Thanh Le
(74) *Attorney, Agent, or Firm* — The Danamraj Law Group, P.C.

(57) ABSTRACT

A radiation power level control system for a wireless user equipment (UE) device. In one embodiment, the system comprises a tracking component for maintaining a history of power data for the wireless UE device, the power data comprising data tracked over a time window relative to one or more variables on a per transmission event basis. A SAR determining module determines one or more SAR values during a current transmission event involving the wireless UE device, wherein the SAR determining module uses the history of power data if the current transmission event occurred within a predetermined duration from a last transmission event. An adjustment module is provided for adjusting a transmit power level of the wireless UE device if at least one of the one or more SAR values exceeds a threshold.

13 Claims, 9 Drawing Sheets

(56) References Cited

FOREIGN PATENT DOCUMENTS

| EP | 2410661 | 1/2012 |
|---|---|---|
| WO | 02/05443 | 1/2002 |
| WO | 03/013020 | 2/2003 |
| WO | 2013074295 | 5/2013 |

OTHER PUBLICATIONS

International Commission on Non-Ionizing Radiation Protection, "Guidelines for Limiting Exposure to Time-Varying Electric, Magnetic, and Electromagnetic Fields (Up to 300 GHz)," ICNIRP Guidelines, 1998 Health Physics Society, 29 pages.
Nathaniel Rich, "For Whom the Cell Tolls, Why Your Phone May (or May Not) Be Killing You," Harper's Magazine, May 2010, 12 pages.
Ep Extended Search Report, Application No. 10170152.2, European Patent Office, Jan. 19, 2011, 7 pgs.
PCT, Written Opinion of the International Searching Authority, Application No. PCT/US2012/062813, Feb. 28, 2013, 10 pgs.
CIPO, Office Action, Application No. 2,746,881, Jun. 7, 2013, 4 pgs.
PCT, Notification Concerning Availability of the Publication of the International Application, Application No. PCT/US2012/062813, May 23, 2013, 1 pg.
EPO, Communication Pursuant to Rules 161(2) and 162 EPC, Application No. 10860032.1, Jul. 3, 2013, 2 pgs.
PCT, Notification Concerning Transmittal of Copy of International Preliminary Report on Patentability, Application No. PCT/CA2010/001864, Jun. 6, 2013, 7 pgs.

\* cited by examiner

RADIATION POWER LEVEL CONTROL SYSTEM AND METHOD FOR A WIRELESS COMMUNICATION DEVICE BASED ON A TRACKED RADIATION HISTORY

INCORPORATION BY REFERENCE TO RELATED APPLICATION(S)

This application discloses subject matter that is related to the subject matter of the following U.S. patent application(s): (i) "TRANSMISSION CONTROL FOR A SPECIFIC ABSOPRTION RATE COMPLIANT COMMUNICATION DEVICE", application Ser. No. 12/536,339; filed Aug. 5, 2009; and (ii) "MODULATION AND CODING SCHEME SELECTION METHOD FOR A SPECIFIC ABSOPRTION RATE COMPLIANT COMMUNICATION DEVICE", application Ser. No. 12/722,362; filed Mar. 10, 2010, now issued as U.S. Pat. No. 8,358,615; which is (are) hereby incorporated by reference.

FIELD OF THE DISCLOSURE

The present patent disclosure generally relates to wireless communication devices, examples of which include mobile handheld devices such as pagers, cellular phones, personal digital assistants (PDAs), smartphones, wirelessly enabled portable computers, and the like. More particularly, and not by way of any limitation, the present patent disclosure is directed to providing radiation power level control with respect to a wireless communication device.

BACKGROUND

For many years the general public has been concerned about the possible health effects of exposure to electromagnetic radio frequency (RF) radiation. Although research is ongoing and there appears to be no scientific consensus on the subject at this time, there have been concerns expressed that high levels of radiation fields may cause a variety of physical effects on the human body. With the dramatic increase in public use of wireless communication devices, and particularly mobile telephones, it has become prudent to consider that these products do not expose their users to levels of radiation that may be excessive. At the frequencies at which most of these devices operate, the known physiological effects center around tissue heating. A measure of this heating effect is known as Specific Absorption Rate (SAR), which is defined as the time derivative of the incremental energy (dW) absorbed by or dissipated in an incremental mass (dm) contained in a volume (dV) of a given density ($\rho$).

As part of worldwide efforts to legislate on consumer health and safety aspects, many regulatory bodies in the United States of America as well as abroad (e.g., governmental agencies such as the Federal Communications Commission or FCC in the United States) now require products that are placed on the market to meet SAR limits. Measurement of SAR has therefore become mandatory for companies that make such products.

The basis for US requirements may be found in ANSI/IEEE C95.1 "Safety Levels with Respect to Human Exposure to Radio Frequency Electromagnetic Fields, 3 kHz to 300 GHz" which establishes exposure limits, and ANSI/IEEE C95.3 "Recommended Practice for the Measurement of Potentially Hazardous Electromagnetic Fields—RF and Microwave". These standards are reflected in the current FCC requirements found in 47 CFR §2.1091 and 2.1093. OET 65 Supplement C 01:01 "Evaluating Compliance with FCC Guidelines for Human Exposure to Radiofrequency Electromagnetic Fields" gives guidance on the application of the FCC rules. (OET is the FCC's Office of Engineering and Technology). The FCC rules for evaluating portable devices for RF exposure compliance are contained in 47 CFR §2.1093. For these purposes, a portable device is defined as a transmitting device designed to be used with any part of its radiating structure in direct contact with the user's body or within 20 centimeters of the body of a user or bystanders under normal operating conditions. For distances greater than 20 centimeters, exposure evaluation is determined by the maximum permissible exposure limits (MPE) provided in OET 65.

For instance, the FCC limit for exposure from cellular telephones is a SAR level of 1.6 watts per kilogram (1.6 W/kg) averaged over 1 gram of tissue. The SAR scan test is usually 6 minutes for most technologies except for those operating in the range of 5 GHz to 6 GHz. Tests for technologies operating at such higher RF levels typically require a smaller step size for the necessary volume scan, thereby giving rise to a testing time of about 15 minutes.

Because of the ever-improving advances in the wireless communication technologies, the regulations for limiting electromagnetic RF radiation are being continuously updated as well. With the change in usage of mobile phones and the concomitant advent of newer technologies, further regulatory changes are anticipated. Currently, with the goal of reducing the likelihood that cellular phone transmissions of electromagnetic radiation will cause harmful effects in users, government regulations in several countries limit the maximum power level with which the cellular phones can radiate. This limitation is tied to a SAR threshold. However, the SAR level for a wireless device is determined in a common, specified manner for all cellular phones, and if a proposed phone design exceeds the SAR threshold, the design of at least part of the RF transmitter system must be adjusted. These adjustments, if not handled well, can be detrimental to the efficiency and performance of the phone's RF systems.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
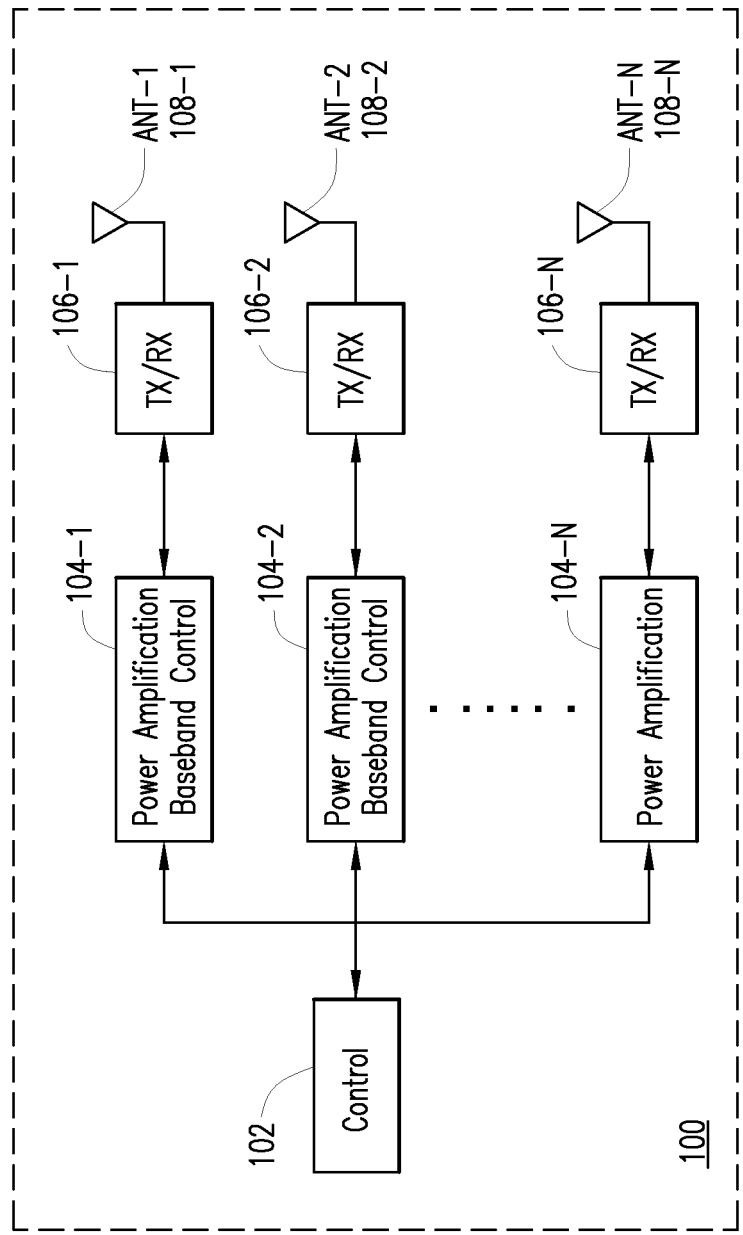
FIG. 1 depicts a block diagram of a wireless user equipment (UE) device wherein transmission power levels may be controlled in accordance with an embodiment of the present patent application.

The present patent disclosure is broadly directed to a radiation power level control scheme based on a tracked radiation history of a wireless UE device. A comprehensive approach is provided based on device usage as well as communication of control signals resulting from dynamic transmission power level measurements, SAR determinations, and the like, to suitable network infrastructure elements.

In one aspect, an embodiment of a radiation power level control method for a wireless UE device is disclosed. The claimed method comprises one or more of the following: determining a time-average transmission power level; comparing the time-average transmission power level with a first time-averaged transmission power limit threshold, the first time-averaged transmission power limit threshold having a value that depends on a transmission power level history for the UE device; and responsive to the time-average transmission power level meeting or exceeding the first time-averaged transmission power limit threshold, reducing a transmission power level of the UE device.

In a related aspect, an embodiment of a wireless UE device is disclosed. The claimed wireless UE device comprises one or more of the following: a component configured to determine a time-average transmission power level associated with the wireless UE device; a component configured to compare the time-average transmission power level with a first time-averaged transmission power limit threshold, the first time-averaged transmission power limit threshold having a value that depends on a transmission power history for the UE device; and a component, operable responsive to the average transmission power level meeting or exceeding the first time-averaged transmission power limit threshold, configured to reduce a transmission power level of the UE device. In one implementation, the wireless UE device may also include a storage element for storing the transmission power level history associated with the wireless UE device, wherein the transmission power level history comprises data tracked over a time window relative to one or more variables, wherein the time window may be fixed, variable, or a sliding window, for example.

In a further aspect, another embodiment of a radiation power level control method for a wireless UE device is disclosed. The claimed method comprises one or more of the following: determining that a current transmission event involving the wireless UE device occurred within a predetermined duration from a last transmission event; responsive to the determining, using a power data history associated with the wireless UE device in determining one or more Specific Absorption Rate (SAR) values during the current transmission event, the power data history comprising data tracked over a time window (which can be a sliding or moving time window, fixed or variable, in one implementation) relative to one or more variables; if the current transmission event occurred outside the predetermined duration from the last transmission event, resetting the power data history and using the reset power data history in determining the one or more SAR values during the current transmission event; and if at least one of the one or more SAR values exceeds a threshold, effectuating a control action relative to the current transmission event, the control action including at least reducing a transmission power level radiating from at least one radio frequency (RF) antenna of the wireless UE device.

In a still further embodiment, a wireless UE device is disclosed that comprises one or more of the following: a storage element for storing a power data history associated with the wireless UE device, the power data history comprising data tracked over a time window (e.g., a sliding window) relative to one or more variables; a component configured to determine one or more SAR values during a current transmission event using the power data history, if the current transmission event involving the wireless UE device occurred within a predetermined duration from a last transmission event; a component configured to reset the power data history if the current transmission event occurred outside the predetermined duration from the last transmission event, and to determine the one or more SAR values during the current transmission event using the reset power data history; a component configured to effectuate a control action relative to the current transmission event, if at least one of the one or more SAR values exceeds a threshold, wherein the control action includes at least reducing a transmission power level radiating from at least one RF antenna of the wireless UE device. Generally speaking, an element may be "configured to" perform a function if the element is capable of performing or otherwise structurally arranged to perform that function.

In a further aspect, an embodiment of radiation power level control system for controlling transmission power level of a wireless UE device is disclosed. The claimed control system comprises one or more of the following: a tracking component for maintaining a history of power data for the wireless UE device, the power data comprising data tracked over a time window (e.g., a sliding window) relative to one or more variables on a per transmission event basis; a SAR determining module for determining one or more SAR values for the wireless UE device during a current transmission event involving the wireless UE device, wherein the SAR determining module is configured to use the history of power data if the current transmission event occurred within a predetermined duration from a last transmission event involving the wireless UE device; and an adjustment module configured to facilitate adjusting a transmit power level of the wireless UE device if at least one of the one or more SAR values exceeds a threshold.

Embodiments of systems, methods, and associated tangible computer-readable media having instructions and tangible computer program products relating to a radiation power level control scheme of the present patent disclosure will now be described with reference to various examples of how the embodiments can be made and used. Like reference numerals are used throughout the description and several views of the drawings to indicate like or corresponding parts to the extent feasible, wherein the various elements may not necessarily be drawn to scale. Referring now to the drawings, and more particularly to FIG. 1, depicted therein is a block diagram of an example wireless UE device 100 wherein transmission power may be controlled in accordance with an embodiment of the present patent application. By way of illustration, the wireless UE device 100 may be any cellular phone, mobile communications device, smart phone, PDA, wirelessly enabled portable computer, pager, and the like. The wireless UE device 100 may be provided with one or more appropriate transceiver and antenna arrangements, each of which may be adapted to operate in a certain frequency band (i.e., operating frequency or wavelength) depending on the radio access technologies of the communications networks such as, without limitation, Global System for Mobile Communications (GSM) networks, Enhanced Data Rates for GSM Evolution (EDGE) networks, Integrated Digital Enhanced Networks (IDEN), Code Division Multiple Access (CDMA) networks, Universal Mobile Telecommunications System (UMTS) networks, any 2nd-2.5-3rd- or subsequent Generation networks, Long Term Evolution (LTE) networks, or wireless networks employing standards such as Institute of Electrical and Electronics Engineers (IEEE) standards, like IEEE 802.11a/b/g/n standards or other related standards such as HiperLan standard, HiperLan II standard, Wi-Max standard, OpenAir standard, and Bluetooth standard, as well as any satellite-based communications technology such as GPS. Accordingly, the wireless UE device 100 may operate in one or more modes, bands, or radio technologies, and may be adapted to communicate using circuit-switched networks (CSNs), packet-switched networks (PSNs), or a combination. The wireless UE 100 may therefore comprise a multi-mode wireless communication device which is not intended to be limited by any of the exemplary types of radio technologies, transceiver circuitry or radiation elements (i.e., antenna technologies, etc.) exemplified herein.

In FIG. 1, the wireless device 100 is illustrated with a plurality of transceivers 106-1 through 106-N, each having an associated radiation element (i.e., antenna) 108-1 through 108-N (i.e., a first antenna, a second antenna, etc.) for transmitting and receiving RF signals carrying information. While each transceiver is shown as being coupled to a corresponding antenna or radiation element, in other embodiments two or more transceivers may share a common antenna. Additionally, each transceiver may be associated with suitable power amplification and baseband controller circuitry 104-1 through 104-N, which may also include Layer 1 software/firmware functionality. In alternative embodiments, the power amplification and baseband controller circuitries may be implemented as a single entity, for example, a digital signal processor (DSP) (not explicitly shown in FIG. 1).

The wireless UE device 100 also includes a controller 102 configured to control the output power of the transmitters accordingly to one or more embodiments set forth hereinbelow in further detail. More generally, in embodiments where there are multiple transceivers, the controller may control the output power of one or more transmitters, or any subset thereof, depending on one or more radiation power control scenarios and associated control logic exemplified in the present patent application. Those skilled in the art will recognize that the controller may be implemented as part of one or more processors, for example, a common DSP, or it may be a separate control entity. For instance, the control functionality may be implemented by a programmably controlled processor using software stored in memory. Moreover, the control functionality may be effectuated under local control (i.e., based on executable control logic resident on the wireless UE device), or under control from a suitable network infrastructure element (e.g., a network node such as a base station or some other network node executing suitable service logic configured to receive information indicative of transmission radiation power levels of one or more wireless devices and operate thereon to generate control signals), or based on any combination thereof.

Figure 2:
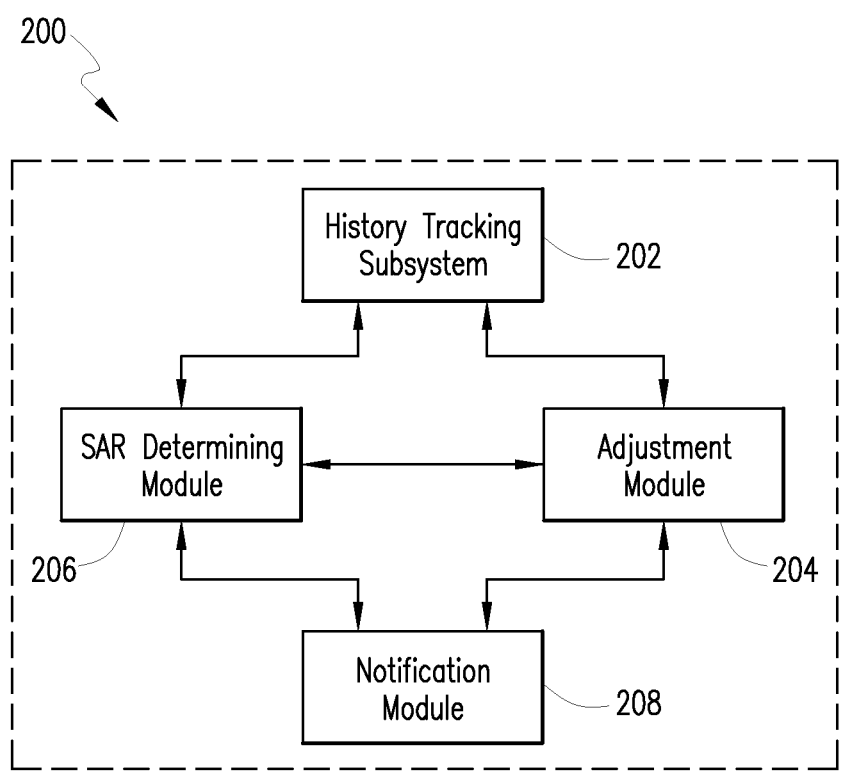
FIG. 2 depicts a block diagram of an embodiment of a radiation power level control system for a wireless UE device for purposes of the present patent application.

FIG. 2 depicts a block diagram of an embodiment of a radiation power level control system 200 for a wireless UE device in accordance with the teachings of the present patent application. A power level and related data history tracking module or subsystem 202 is configured to monitor, record, store, update (e.g., bring data up to date or verify the data as current, which may or may not involve changing any data), and/or otherwise maintain data relating to one or more variables relevant to power level computations. A Specific Absorption Rate (SAR) determining module 206 is provided for determining one or more SAR values for a wireless UE device, wherein the SAR determining module is configured to use, for example, the historical power level data, duration of the activity in addition to other related data maintained by the power level/data history tracking module 202 depending at least in part on how the calls or data transmission events involving the UE device are spaced in time. It will be recognized that a wireless UE device may engage in several types of communication activities, e.g., voice calls, video calls, data sessions, data downloads or transmissions, as well as various uplink communications to the network, each having variable durations and power level transmission characteristics. For purposes of the present patent application, accordingly, the term "transmission event" is intended to cover all such communication activities in a non-limiting way. An adjustment module 204 is configured to facilitate adjusting a transmit power level of the wireless UE device based on the SAR information provided by the SAR determining module 206. The adjustment module 204 may also be configured to communicate with the power level/data history tracking module 202 for updating or otherwise manipulating the power data therein. The history tracking subsystem 202 can provide current SAR values computed from the current transmission event and can also include future SAR values calculated from extrapolated values using the SAR values from previous events. Accordingly, by way of illustration, the data (which includes both power level data as well as transmission event time data) may be updated such that the "updated" data may include any or all past, current, and future extrapolated data. Additionally, a notification module 208 is configured to provide a notification message to the user, to the wireless UE device, to a network node, or any combination thereof, wherein the notification message may be generated at least depending on the SAR measurement information provided by the SAR determining module 206 with respect to an ongoing transmission event in which the wireless UE device is currently engaged. The functionality of the adjustment module 204 and/or the notification module 208 may also include, inter alia, generating appropriate control signals to control, change or otherwise manipulate a modulation and coding scheme (MCS) used by the wireless UE device in its current transmission event.

It should be recognized that the foregoing radiation power control scheme may be implemented entirely on a wireless UE device (i.e., local control), in a network node (i.e., remote control), or in a combination thereof, wherein one or more components of the radiation power control scheme may be realized in a serving network. As used herein, a component may comprise one or more tangible elements, such as a sensor or processor, and may comprise program instructions that may configure the elements to perform one or more operations. For example, a power level/data history monitoring system or subsystem may be deployed at a base station for maintaining various data relevant to power level, transmission event time information and SAR computations with respect to the wireless UE devices served by the base station. Associated therewith may also be a SAR determining module as well as an adjustment module, which can determine SAR values for each UE device and send appropriate control signals thereto (e.g., to reduce the transmit power level, change the MCS, to provide user notifications, etc.). In an alternative arrangement, such functionality may be located at a different hierarchical location in the network, e.g., a centralized network node that receives or otherwise obtains appropriate information signals indicating transmission characteristics of ongoing events engaged by various wireless devices. One or more such alternative arrangements will be set forth in additional detail hereinbelow.

Regardless of where the example radiation power level control scheme is implemented, the power level/data history tracking module 202 of the scheme may be configured to monitor data over a time window that may be fixed or variable, and may be configured to take into account, inter alia, various usage modes associated with a wireless UE device, historical data relating to how the transmission events are distributed over time, durations and types of the transmission events, and the like, such that a SAR determining module can intelligently incorporate such data into computing or otherwise determining a more realistic SAR value for a wireless UE device during a transmission event. By incorporating or taking in account various parameters, an adaptive power level control scheme may be implemented by varying the durations of a sliding time window depending on, e.g., usage modes, transmission event types, etc. Examples of such parameters may include determining that transmission events that are of same type (e.g., voice calls, data transmissions, or the like) and sufficiently close to one another in time may affect the SAR value determinations, or determining that some transmission events are sufficiently separated in time and/or of different type may not so affect the SAR value determinations, Additionally, SAR values determined by taking into account the data tracked over a course of time are expected to be more accurate, and thus help achieve regulatory compliance in a more meaningful and faithful manner.

Figure 3:
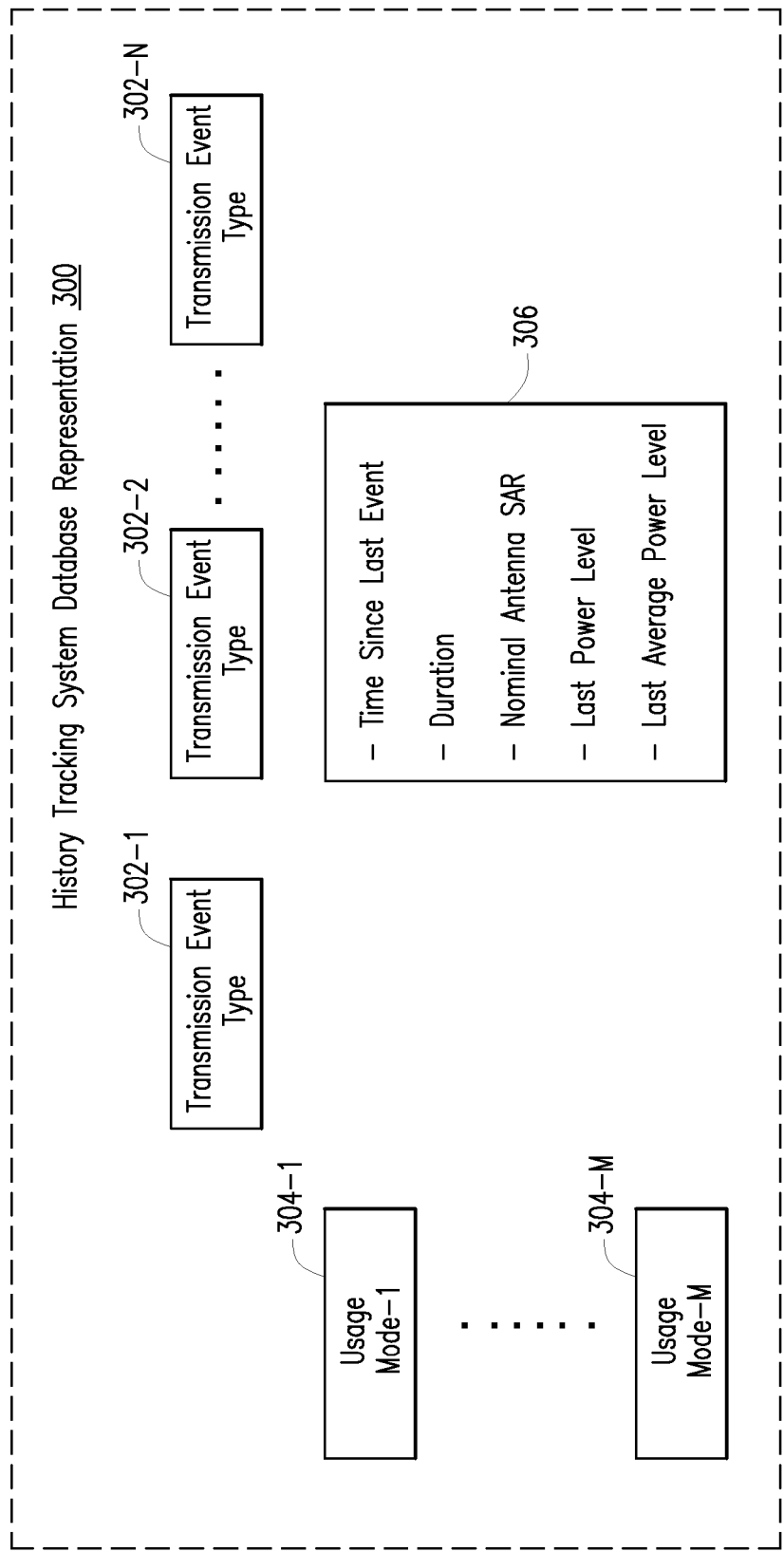
FIG. 3 depicts an illustrative example of a tracked power level/data history database representation according to one embodiment.

FIG. 3 depicts an example of a database representation 300 of a tracked power level and transmission event time data history according to one embodiment, which is illustrative of a database that may be maintained within a wireless UE device, at a network node or may be distributed in any fashion. A variety of transmission event types involving a wireless device, such as, e.g., voice calls, data sessions, uplink communications, etc., essentially any event that may have an impact on the transmit power level of the wireless UE device and therefore may have an effect on the SAR to which the user may be exposed, may be tracked for developing a fairly comprehensive power data history for purposes of the present patent application. Reference numerals 302-1 through 302-N refer to N types of such transmission events that may encompass the full range of communication activities by a wireless UE device. A number of device usage modes 304-1 through 304-M may be included for tracking mode-specific power data histories. An example usage mode may be where the wireless UE device is normally positioned near a user's ear for making a phone call. Another example usage mode may be where the wireless UE device is placed in a holster that is positioned adjacent to the user's body. Another example usage mode is where the wireless UE device is placed in a bag, a purse, or a holster, or some container, which may be positioned near the user or at a point away from the user. A still further usage mode is where the wireless UE device is placed in a speakerphone mode and is positioned away from the user's body and/or placed on a desk, for example. It should be apparent that the usage modes set forth in the foregoing non-limiting list are merely illustrative and any number of usage modes may be realized depending on a particular implementation for purposes of the present patent application.

Various techniques and schemes, both device-based and network-based, may be used for determining and tracking device usage. For example, components such as accelerometers, motion sensors, temperature sensors, position/location sensors, etc. may be provided in a wireless UE device to determine if the device is on a flat surface such as a desk, near the user's body, in a holster, in a speakerphone mode, or near the user's ear, etc., while engaged in a transmission event. When a transmission event takes place in multiple usage modes, it is therefore possible to separately track the usage in the different modes used and accordingly update the power data history. For example, if the usage is initially by placing the device near the user's ear and then switched to speakerphone mode, the history tracking system is configured to save the history for the ear usage mode and the speakerphone usage mode as needed. Additionally, although a number of usage modes are illustrated in FIG. 3, one implementation of the database representation and associated radiation power level control scheme may not make or require such distinctions and therefore treat all usage modes as the same for purposes of SAR determination.

Regardless of how many transmission event types and/or usage modes are comprehended, the database representation 300 may be populated with, for each transmission type and usage mode, data 306 relating to variables including but not limited to, e.g., (i) time elapsed since the last transmission event, (ii) duration of the last transmission event, (iii) nominal antenna SAR values (which can be operating frequency-dependent and may be programmed into the wireless UE device or downloaded), (iv) last power level (total or peak) and (v) last average power level, and other related parametrics. Such data 306 may be maintained for a time window, e.g., a sliding or moving time window, may cumulatively be referred to herein as "power data history". Since SAR determinations applicable for one usage mode and/or transmission event type may not be relevant to other usage modes and/or transmission event types, a more realistic and accurate SAR measurement process may be implemented by tracking the mode-specific and event-specific data as set forth hereinabove.

Figure 4:
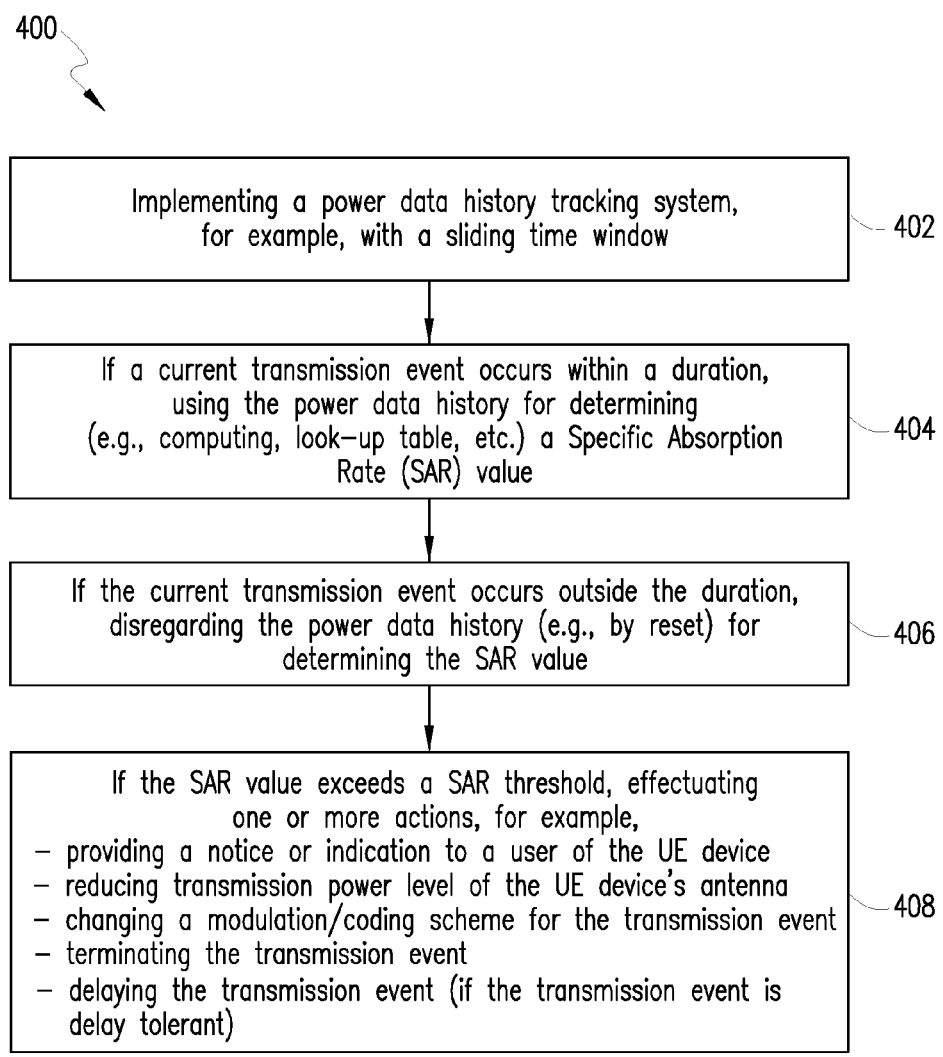
FIG. 4 is a flowchart of an example radiation power level control scheme of the present patent application.

FIG. 4 is a flowchart of an example radiation power level control scheme 400 of the present patent application according to one embodiment. At block 402, a power data history tracking module, component, system or subsystem is implemented for monitoring, recording, updating and maintaining appropriate power level/data over a period of time as set forth above. As described previously, a configurable time window, either fixed or variable, may be imposed so that only more recent power data history is utilized for SAR determinations. However, the entire historical record of the cumulative power data may be warehoused or otherwise maintained either locally on the device or remotely at a network node. When the wireless UE device commences a transmission event (designated as a current transmission event), a determination is made whether or not the current transmission event is within a predetermined duration from a last transmission event (block 404). In general, a quantity or element in a step of a method of the present application is "predetermined" when it is determined at any time before the step in the method is reached. With this in mind, if the current transmission event is within a predetermined duration, responsive to such determining, the power data history associated with the wireless UE device is used in measuring, computing or otherwise determining (including, e.g., using a look-up table that is locally stored on the UE device or otherwise) one or more SAR values during the current transmission event, wherein the power data history comprises data tracked over a time window (block 404). If the current transmission event occurs or commences outside the predetermined duration from the last transmission event, the power data history is disregarded for determining the SAR computations (block 406). In one implementation, the power data history tracked over the time window may be reset or reinitialized to certain predetermined default data, including, e.g., zeroing out the data tracked over the time window. Thereafter, a further determination is made if one or more SAR values determined—either incorporating the tracked power data (as in block 404) or not (as in block 406)—exceeds a threshold value (e.g., based on SAR limits imposed by regulatory bodies, marketing or industry consortia, or limits imposed internally by the manufacturer or configured by the user, and the like). If so, a control action may be effectuated relative to the ongoing current transmission event, for example, reducing a transmission power level radiating from at least one RF antenna for the wireless UE device, providing a notification or indication to the user of the wireless UE device that the SAR level has exceeded, changing the MCS (including the number of transmission slots, for instance) used by the wireless UE device, terminating the transmission event, providing a notification or indication to a serving node, e.g., a base station or an enhanced Node B (if the process is executed on the wireless UE device), providing a control signal or notification to the wireless UE device (if the process is executed at a network node), delaying the transmission event in the case of delay-tolerant transmission, and the like (block 408). Those skilled in the art should recognize that this list of control actions is non-limiting and one or more actions may take place at the wireless UE device while another set of control actions may take place if the power level control process is executed elsewhere. Additionally, two or more control actions (i.e., a composite control action) may take place in some implementations.

Figure 5A:
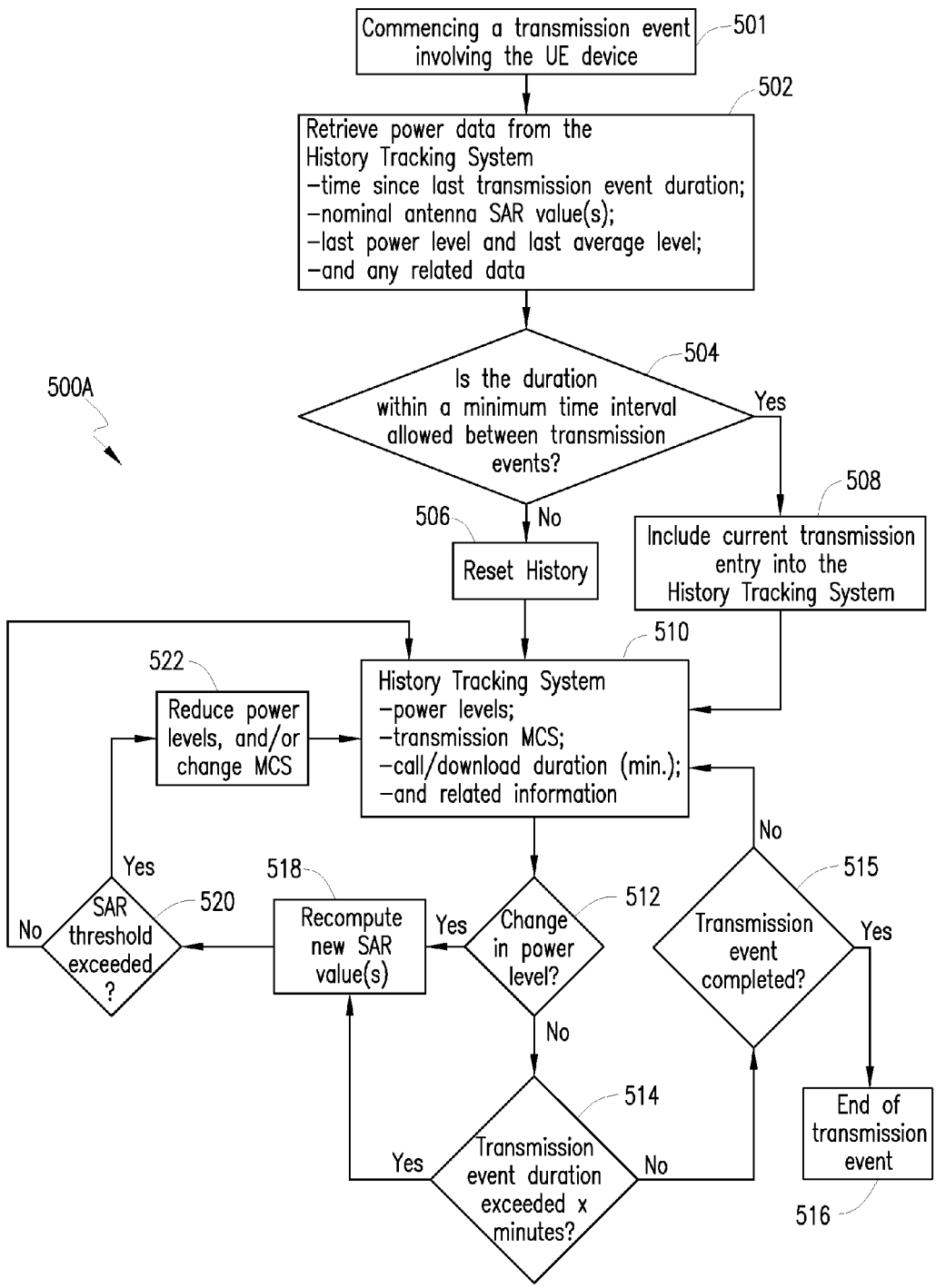
FIG. 5A is a flowchart of an example radiation power level control method in additional detail according to one embodiment.

FIG. 5A is a flowchart of an example radiation power level control method 500A that amplifies the foregoing scheme with additional detail according to one embodiment. When a new current transmission event involving the UE device takes place (block 501), suitable power data history is retrieved from a history tracking system, which includes, inter alfa, time elapsed since the last transmission event (block 502). At block 504, a determination is made if the duration between the current transmission event and the last transmission event is within a minimum time interval allowed between transmission events. As alluded to previously, the minimum time interval may be configured, variable, fixed, or otherwise provisioned for a particular wireless UE device and may be adaptive based on transmission event types and/or usage modes. If the duration is within the minimum time interval, the power data retrieved from the history tracking system is used for computing or recomputing SAR values, in addition to updating the history tracking system with the current power data (block 508). On the other hand, if the duration between the last and current events is not within the minimum time interval, the power data history is reset (block 506). As the current transmission event provisioned with initial transmit power levels, transmission MCS and other transmission parametrics commences or continues to take place, the power data history tracking system continues to monitor the current transmission event time, power levels, and other related information (block 510). At block 512, a decision is made if there is a change in the power level during the transmission event (e.g., relative to a tracked power level value, a predetermined limit, etc.). If so, a SAR determination module computes, recomputes, measures, or otherwise determines a new SAR value, which can be based on mathematical formula or a look-up table, etc. (block 518). Where a multi-mode transmission event is taking place, i.e., with more than one transceiver plus antenna combination being effective, the new SAR value may be a summation of the SAR components for each transceiver plus antenna combination. In one embodiment, a new SAR value may be computed as a function of nominal SAR (which itself is dependent on the operating frequency and may be determined during the design of a particular wireless UE device), nominal power level, and nominal transmission configuration (including a nominal number of transmission slots and associated modulation/coding scheme, for instance) and other related parametrics. Additional details regarding transmission power level measurements, SAR computations and MCS adjustment schemes may be found in the following co-pending, commonly assigned U.S. patent applications: (i) "TRANSMISSION CONTROL FOR A SPECIFIC ABSOPRTION RATE COMPLIANT COMMUNICATION DEVICE", application Ser. No. 12/536,339; filed Aug. 5, 2009; and (ii) "MODULATION AND CODING SCHEME SELECTION METHOD FOR A SPECIFIC ABSOPRTION RATE COMPLIANT COMMUNICATION DEVICE", Ser. No. 12/722,362; filed Mar. 10, 2010, now issued as U.S. Pat. No. 8,358,615; which are hereby incorporated by reference.

Continuing to refer to the flowchart of FIG. 5, if there is no change in the power level, a further determination is made (block 514) with respect to duration of the ongoing transmission event. If the transmission event exceeds a predetermined time limit (e.g., a user- or manufacturer- or network-configurable threshold, which again can be variable or fixed depending on transmission event type and usage mode), the SAR determination module is invoked and executed as described above (block 518). Otherwise, if the current transmission event has not been completed (block 515), the control flow returns to monitoring the power levels (total, peak, average, or any combination) and other transmission parametrics by the power data history tracking system at block 510. Thus, it should be realized that in this embodiment both transmit power levels and elapsed time during the transmission event are monitored and new SAR values are appropriately determined until the current transmission event is terminated (block 516).

As the SAR determination module continues to compute or re-compute the new SAR values as necessary (block 518), for each new SAR value a determination is made if the new SAR value exceeds a threshold (block 520). As described previously, the SAR thresholds may be configured in a number of ways, stored locally or on the network, and may also be set up based on transmission event types and/or usage modes, device type, antenna placement, etc. Additionally, the SAR thresholds may also be configured based on individual users since different users may have different radiation energy tolerances (e.g., depending on gender, body type and/or health condition, pregnancy, and the like). Regardless of how the SAR threshold values are set up, if a computed/recomputed new SAR value does not exceed the applicable threshold, the control flow returns to monitoring the power levels and other transmission parametrics by the power data history tracking system at block 510 as before. However, if a new SAR value exceeds the threshold, transmit power levels may be reduced, MCS may be changed (e.g., from a scheme of quadrature phase shift keying (QPSK) with a suitable coding rate (for instance, ⅓, ½ or ⅔) to a scheme of quadrature amplitude modulation (QAM) at coding rates of ½, ⅔, or so on), as set forth in block 522. In addition, as previously described, additional control actions, signals and notifications may also take place, including termination of the transmission event itself (block 516). In a further variation, the SAR threshold values may be implemented with suitable lower and upper guard bands such that when a "floor" is reached an advance warning may be provided and extrapolated SAR may re computed as part of the functionality of blocks 518 and 520. Also, with different guard bands implemented, different levels of control actions and notifications may be generated in accordance with the teachings of the present patent disclosure.

Figure 5B:
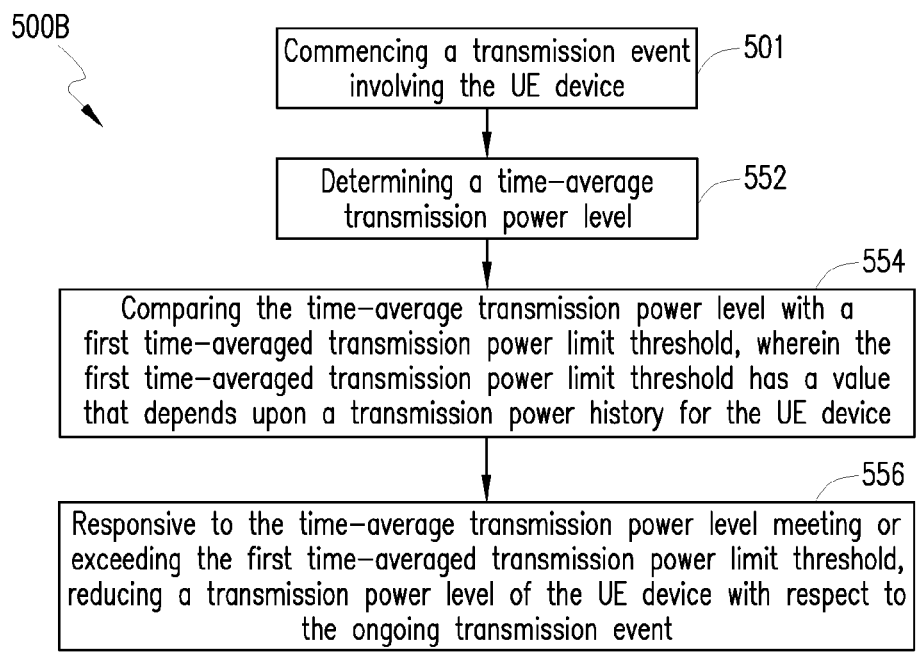
FIG. 5B is a flowchart of another example radiation power level control method according to a further embodiment of the present patent application.

FIG. 5B is a flowchart of another example radiation power level control method 500B for a UE device in a further embodiment of the present patent application that involves using a tracked power level and transmission event time history. Upon commencing a transmission event involving the UE device (block 501), a time-average transmission power level (or time-average power level, for short) is determined over a time window, which may be fixed or variable as previously described (block 552). In general, a time-average transmission power represents an average of transmission power measured over the time window. The average may be, but need not necessarily be, the arithmetic mean. The average may also comprise one or more values that represent the general significance of a set of transmission power values, such as a weighted average or a median or an approximation of the arithmetic mean. The time-average transmission power level is compared against a threshold value, e.g., a first time-averaged transmission power limit threshold, wherein the first time-averaged transmission power limit threshold has a value that depends on a transmission power history for the UE device (block 554). For example, but not by way of limitation, an illustrative transmission power history may comprise, a tracked power level and transmission event time data history set forth hereinabove. Thereafter, responsive to the time-average transmission power level meeting or exceeding the first time-averaged transmission power limit threshold, a control action, e.g., reducing a transmission power level of the UE device with respect to the ongoing transmission event, may be effectuated (block 556). As before, any threshold values relating to transmission power levels, time-averaged, instantaneous, peak, or otherwise, may be stored in the UE device, at a network node, and may be configurable. In one specific implementation involving a manipulation of the transmission power level, reducing the transmission power level may comprise reducing a number of transmission time slots used by the UE device. Additionally, optionally, or alternatively, the feature of reducing the transmission power level may also comprise retaining, within each of the reduced number of transmission time slots, a time slot transmission power level that is consistent with a time slot transmission power level used by the UE device prior to the reducing. In another implementation, reducing the transmission power level of the UE device may involve reducing a frame-average transmission power level used by the UE device, wherein the frame-average transmission power level is averaged over a single transmission frame comprising multiple time slots and the time-average transmission power level is averaged over multiple transmission frames. In a still further implementation, reducing the transmission power level of the UE device may comprise turning off one or more transmission functions, or turning off the UE device completely. For example, additional details regarding transmission power level measurements and associated adjustment schemes may be found in one or more of the co-pending, commonly assigned U.S. patent applications incorporated by reference hereinabove.

Where multiple types of communication processes take place in an ongoing current transmission event, another variation may involve retaining a first communication process and suspending a second communication process, in conjunction with (or in some cases in alternative to) reducing the transmission power level. For instance, as alluded to previously, the first communication process may comprise a voice call whereas the second communication process comprises a data file transfer, or vice versa. Where a composite control action may be involved (e.g., effectuating two or more control actions relative to a radiation power level control method for the UE device), one or more of the communication processes of the transmission event may be suspended, along with providing a notification to a user. As described previously, additional variations of composite control actions (e.g., two or more control actions being effected in conjunction) may include sending a message to a serving network node, e.g., an enhanced/evolved Node B (eNodeB or eNB) in an LTE network, a conventional base station, or some other network node in a core or service network, wherein the message is configured to indicate a change in one or more parameters relating to the transmission event, e.g., the transmission power level of the UE device.

Continuing to refer to the embodiment of FIG. 5B, another implementation may involve, in conjunction with reducing the UE device's transmission power level, changing a modulation and coding scheme (MCS) from a first MCS to a second MCS, wherein the second MCS may be configured to provide a lower expected bit-error-rate (BER) than a BER for the first MCS at the reduced transmission power level. As a further variation, the radiation power level control method 500B may also include the acts of: (i) comparing the time-average transmission power level with a second time-averaged transmission power limit threshold, the second time-averaged transmission power limit threshold having a lower value than the first time-averaged transmission power limit threshold; and (ii) responsive to the time-average transmission power level meeting or falling below the second time-averaged transmission power limit threshold, increasing a transmission power level of the UE device. In this variation, increasing the transmission power level may comprise increasing a number of transmission time slots used by the UE device. Also, in conjunction with increasing the transmission power level, the MCS used by the UE device may be changed from a first MCS to a second MCS, wherein the second MCS provides a higher data rate than a data rate for the first MCS.

In a still further variation, the radiation power level control method 500B may also include one or more of the following acts: (i) determining whether a current transmission event occurs within a predetermined duration window from a prior transmission event; (ii) responsive to determining that the current transmission event does occur within the predetermined duration window, including at least a portion of a transmission power level history of the prior transmission event in the determination of average transmission power level; and (iii) responsive to determining that the current transmission event does not occur within the predetermined duration window, excluding the transmission power level history of the prior transmission event from the determined average transmission power level. Similar to the features previously described with respect to some of the other embodiments, the radiation power level control method 500B may also include tracking at least one radiation history parameter selected from the list consisting of: a time elapsed since a prior transmission event, a duration of the prior transmission event, a final power level (e.g., a last power level, either peak or average, etc.) of the prior transmission event, a time-average power level of the prior transmission event, and one or more antenna SAR values of the UE device (if provided with multiple antennas as exemplified in FIG. 1, for instance).

Those skilled in the art should recognize that because of the diverse array of information relating to power levels, transmission event timing parametrics, etc., that is tracked as part of the radiation history of a UE device, several additional features can also be implemented with respect to the radiation power level control method 500B. In one variation where the UE device is provided with multiple antennas, some of the control actions may involve determining whether changing transmission from a first antenna to a second antenna will reduce a SAR exposure of a user of the UE device (e.g., amount of radiation exposed to the user); and, additionally or optionally, responsive to determining that changing transmission from the first antenna to the second antenna will reduce a SAR exposure, ceasing transmission from the first antenna and transmitting with the second antenna and/or providing a suitable notification in connection therewith. Where a private call mode is employed with respect to the transmission event, the radiation power level control method 500B may further include, for example, the acts of determining whether the UE device is in use according to a private voice call mode (e.g., without limitation, the calling party's number is kept private and may not be identified by caller ID); and responsive to determining that the UE device is not in use according to a private voice call mode, suspending comparison of the time-average transmission power level with a first time-averaged transmission power limit threshold. In such an implementation, additional refinements may include, for example, the determination that the UE device is in use according to a private call mode may be based on whether the UE device is holstered, whether the UE device is in a speakerphone mode, and the like. The speakerphone mode may be determined based on, e.g., detecting that the speakerphone speaker is activated, an accelerometer indicates a horizontal orientation of the UE device (e.g., without limitation, an orientation that is determined as horizontal with respect to an axis of the device), or both.

In another embodiment involving the UE device being in use in a private voice call mode, a determination that the UE device is in the private voice call mode may be made based on whether the UE device is in use according to a data entry mode. In such an implementation, additional refinements may include, for example, the determination that the UE device is in use according to a data entry mode may be based on whether the UE device's keyboard is registering key presses at a rate that is consistent with typing by a user, whether an accelerometer indicates a data entry orientation of the UE device, or both. Where the UE device is determined to be not in use according to a private call mode, a comparison of the time-average transmission power level may be made with an alternative power limit threshold that is different than the first time-averaged transmission power limit threshold as set forth in FIG. 5B. As described in detail previously in reference to the other embodiments, one or more features relating to the embodiment of FIG. 5B may be performed or otherwise implemented on the UE device, or at a network node, or in any combination thereof.

Figure 6:
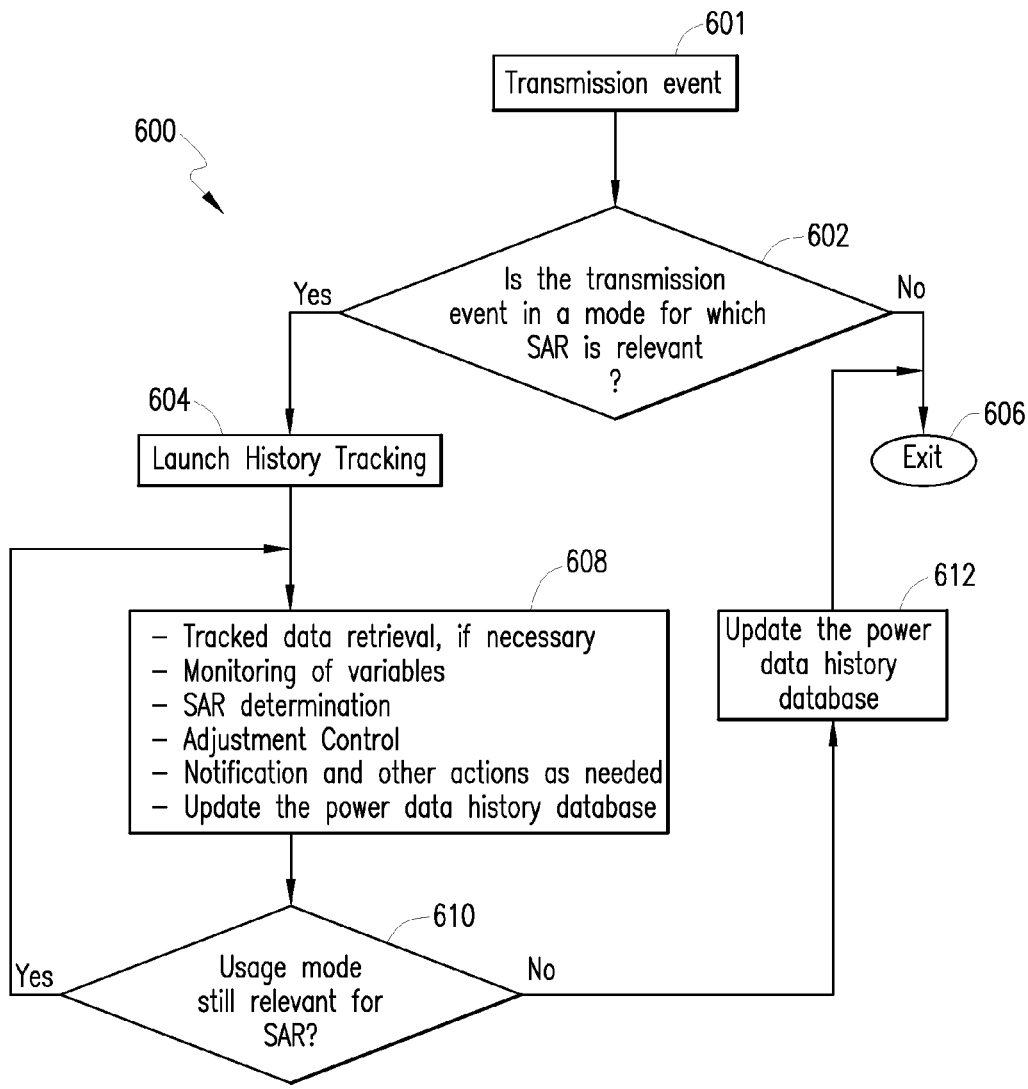
FIG. 6 is a flowchart of another example method of the present patent application.

Referring now to FIG. 6, depicted therein is a flowchart of another example method 600 of the present patent application for use with one or more variations of an adaptive radiation power level control scheme described hereinabove. When a transmission event involving a wireless UE device commences (block 601), a determination may be made as to whether the transmission event is in a mode for which SAR measurements are relevant. If the transmission event or its usage mode is such that the SAR measurements are not implicated, there is no need to launch a power data history tracking module and monitor and update the power data history. The process flow of the adaptive radiation power level control can exit and the transmission event can continue in conventional manner (block 606). Otherwise, the power data history tracking module may be launched (block 604), whereupon tracked power data may be retrieved if necessary. Transmission power levels, SAR values, etc. may be determined and appropriate adjustment control and associated control actions may be taken (block 608) as described in detail above. If the usage mode changes during the transmission event, that is, for example, where the transmission event may comprise multiple communication processes, a further determination may be made (block 610) whether to continue tracking the power level data and determine SAR values accordingly. If so, the acts of block 608 may continue to be taken. Otherwise, the power history data may be updated, if needed, upon the transition of a communication process or usage mode, and the process flow may exit as necessary (block 606).

Figure 7:
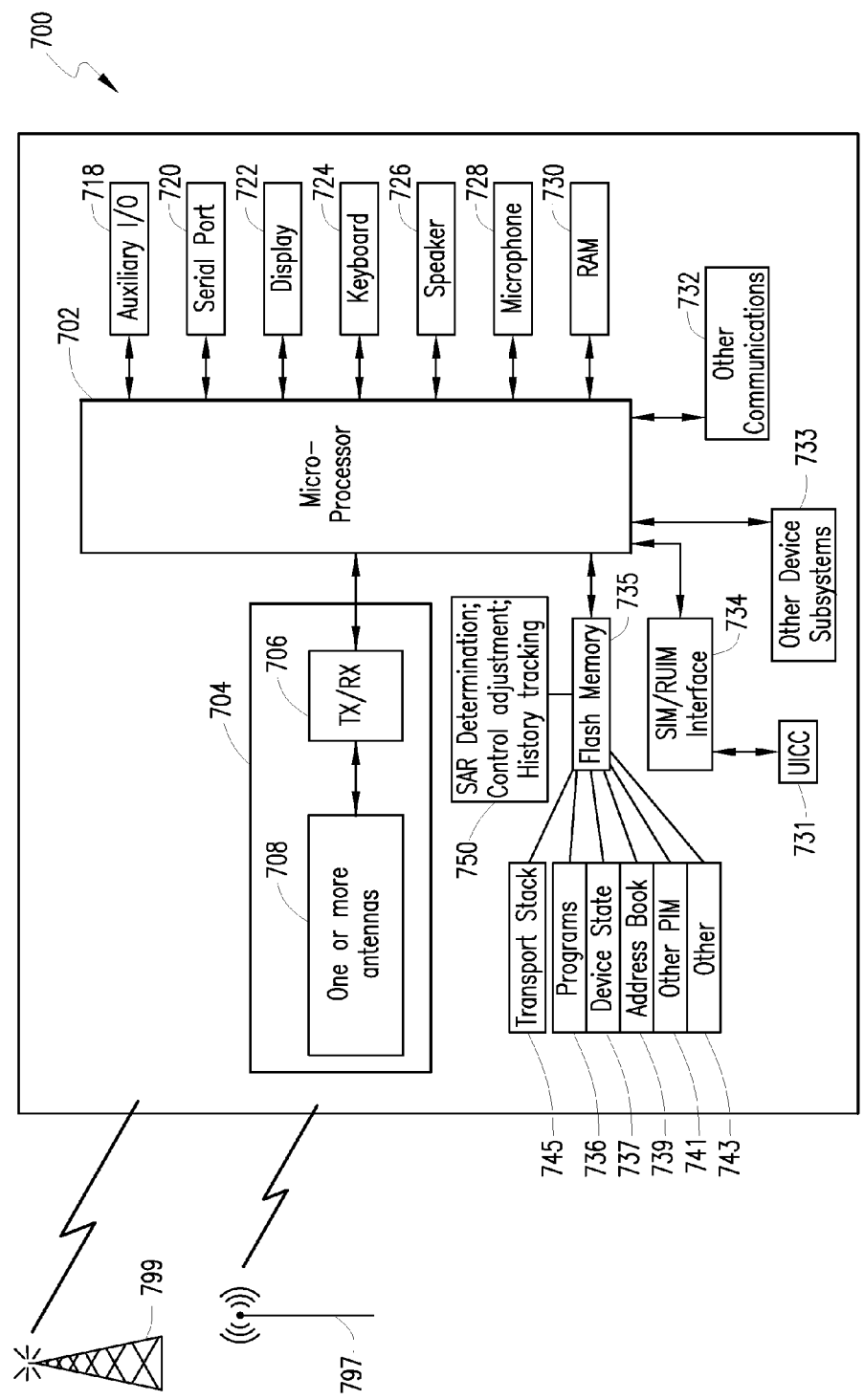
FIG. 7 depicts a block diagram of an example wireless UE device in additional detail according to one embodiment of the present patent application.

FIG. 7 depicts a block diagram of an example wireless UE device 700 according to one embodiment of the present patent application. It should be understood that the wireless UE device 700 may be another embodiment of a wireless UE device such as the device 100 with additional structural and functional elements shown. Wireless UE device 700 may be provided with a communication subsystem 704 that includes an antenna assembly 708 and suitable transceiver circuits 706 whose power output levels can be controlled according to one or more embodiments of the present disclosure. A microprocessor 702 providing for the overall control of the device 700 is operably coupled to the communication subsystem 704, which can operate with various access technologies, operating bands/frequencies and networks (for example, to effectuate multi-mode communications in voice, data, media, or any combination thereof). As will be apparent to those skilled in the field of communications, the particular design of the communication module 704 may be dependent upon the communications network(s) with which the device is intended to operate, e.g., as exemplified by infrastructure elements 799 and 797. Further, the antenna assembly 708 may comprise radiation elements that may be realized in any known or heretofore unknown elements such as, e.g., a patch antenna, an inverted F antenna (IFA) strip, a modified inverted F antenna (MIFA) strip, a planar inverted F antenna (PIFA) strip, and the like, in any shape, size and form factor.

Microprocessor 702 also interfaces with additional device subsystems such as auxiliary input/output (I/O) 718, serial port 720, display 722, keyboard 724, speaker 726, microphone 728, random access memory (RAM) 730, other communications facilities 732, which may include for example a short-range communications subsystem, and any other device subsystems generally labeled as reference numeral 733. Example additional device subsystems may include accelerometers, motion sensors, temperature sensors, and the like. To support access as well as authentication and key generation, a SIM/USIM interface 734 (also generalized as a Removable User Identity Module (RUIM) interface) is also provided in communication with the microprocessor 702 and a UICC 731 having suitable SIM/USIM applications. As noted above with respect to FIG. 2, a notification module 208 may be configured to provide a notification message to, for example, a user or a network node, depending on where the notification module is implemented. The notification message may be provided to a user by way of the display 722 or speaker 726, for example. The notification message may be provided to a network node via transceiver circuits 706, serial port 720 or other communications facilities 732, for example. In some embodiments, microprocessor 702 can be configured to carry out, in conjunction with one or more subsystems of the UE device 700 described herein, one or more operations of radiation power level control system 200 shown in FIG. 2, in addition to one or more features of the embodiments of FIGS. 5A-5B and FIG. 6.

Operating system software and other system software may be embodied in a persistent storage module 735 (i.e., non-volatile storage) which may be implemented using Flash memory or another appropriate memory. In one implementation, persistent storage module 735 may be segregated into different areas, e.g., transport stack 745, storage area for computer programs 736, as well as data storage regions such as device state 737, address book 739, other personal information manager (PIM) data 741, and other data storage areas generally labeled as reference numeral 743. Additionally, the persistent memory may include appropriate software/firmware 750 necessary to effectuate transmission power level measurement and computations, SAR determinations, power level adjustment control, power data history tracking and associated database(s), in conjunction with one or more subsystems set forth herein under control of the microprocessor 702 or specialized DSP circuitry. Powered components may receive power from any power source (not shown in FIG. 7). The power source may be, for example, a battery, but the power source may also include a connection to power source external to wireless UE device 700, such as a charger.

Figure 8:
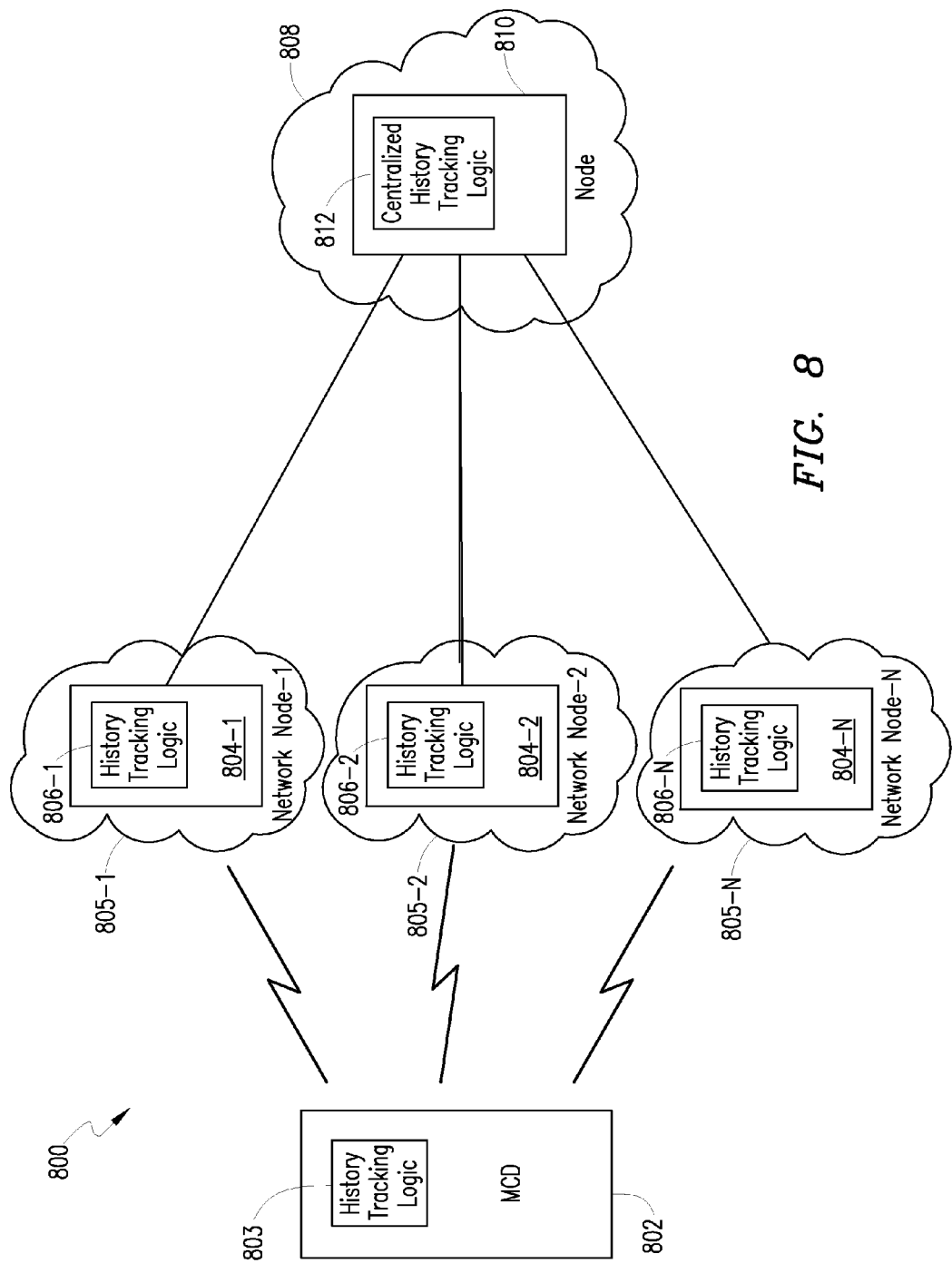
FIG. 8 is an example network environment wherein an embodiment of a radiation power level control scheme may be implemented by one or more elements of the network environment.

FIG. 8 is an example network environment 800 wherein an embodiment of a radiation power level control scheme may be implemented by one or more elements of the network environment. A mobile communications device (MCD) 802 may be representative of a multi-mode wireless UE device, and comprises a power data history tracking logic and adjustment control module 803 that may be implemented in hardware, software, firmware or in any combination, operable with one or more processors. Networks 805-1 to 805-N may be any wireless networks, including but not limited to wide area cellular networks, CSNs, PSNs, cellular packet data networks, wireless LANs, etc. that may employ known or hereto unknown radio technologies. Further, with respect to MCD 802, one or more networks may be home networks or equivalent home networks, while one or more networks may be visited or roaming networks, wherein each network's serving infrastructure is illustrated as corresponding network nodes 804-1 to 804-N. One or more network nodes may be provided with a power data history tracking logic and adjustment control module that may be implemented in hardware, software, firmware or in any combination, operable with one or more processors, for tracking, monitoring and maintaining the power data history relating to MCD 802. Reference numerals 806-1 to 806-N refer to such structure and functionality associated with each network node. Depending on particular implementation, a network node may be configured to provide appropriate transmit power level and/or MCS adjustment control signals to MCD 802, whereby the uplink scheduling for the MCD can be performed optimally. In a further variation, one or more network nodes may provide the power data history to another network node 810 at a different network hierarchy (e.g., a service network 808) that includes centralized adjustment control and/or power data history tracking logic 812. In a still further variation, MCD 802 may communicate with the service network node 810 and receive appropriate control signals therefrom.

Various processes, structures, components and functions set forth above in detail, associated with one or more network nodes or a wireless UE device, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A radiation power level control method for a wireless user equipment (UE) device, said method comprising:
determining that a current transmission event involving said wireless UE device occurred within a predetermined duration from a last transmission event;
responsive to said determining, using a power data history associated with said wireless UE device in determining one or more Specific Absorption Rate (SAR) values during said current transmission event, said power data history comprising data tracked over a time window relative to one or more variables;
if said current transmission event occurred outside said predetermined duration from said last transmission event, resetting said power data history and using said reset power data history in determining said one or more SAR values during said current transmission event; and
if at least one of said one or more SAR values exceeds a threshold, effectuating a control action relative to said current transmission event, said control action including at least reducing a transmission power level radiating from at least one radio frequency (RF) antenna of said wireless UE device.

2. The radiation power level control method of claim 1 wherein said control action further includes at least one of (i) providing a notification to a user of said wireless UE device engaged in said current transmission event; (ii) changing a modulation and coding scheme (MCS) used in said current transmission event; (iii) terminating said current transmission event; and (iv) delaying said current transmission event.

3. The radiation power level control method of claim 1 wherein said power data history includes data relating to at least one of: (i) time elapsed since said last transmission event; (ii) duration of said last transmission event; (iii) one or more nominal antenna SAR values of said wireless UE device; (iv) last power level; and (v) last average power level.

4. The radiation power level control method of claim 1 wherein said current transmission event comprises at least one of a voice call, a data session, and an uplink event.

5. The radiation power level control method of claim 1 wherein said current transmission event in a usage mode comprising at least one of: a speakerphone mode, a mode of positioning said wireless UE device near a user's ear, a mode of placing said wireless UE device in a user's holster, and a mode of placing said wireless UE device at a place positioned away from a user's body.

6. A wireless user equipment (UE) device comprising:
- a storage element for storing a power data history associated with said wireless UE device, said power data history comprising data tracked over a time window relative to one or more variables;
- a component configured to determine one or more Specific Absorption Rate (SAR) values during a current transmission event using said power data history, if said current transmission event involving said wireless UE device occurred within a predetermined duration from a last transmission event;
- a component configured to reset said power data history if said current transmission event occurred outside said predetermined duration from said last transmission event, and to determine said one or more SAR values during said current transmission event using said reset power data history; and
- a component configured to effectuate a control action relative to said current transmission event, if at least one of said one or more SAR values exceeds a threshold, wherein said control action includes at least reducing a transmission power level radiating from at least one radio frequency (RF) antenna of said wireless UE device.

7. The wireless UE device of claim 6 wherein said component configured to effectuate a control action relative to said current transmission event further includes a component configured to perform at least one of: (i) provide a notification to a user of said wireless UE device engaged in said current transmission event; (ii) change a modulation and coding scheme (MCS) used in said current transmission event; (iii) terminate said current transmission event; and (iv) delay said current transmission event.

8. The wireless UE device of claim 6 wherein said component configured to reset said power data history comprises a component configured to zero out said power data history tracked over said time window.

9. The wireless UE device of claim 6 further comprising a component configured to update said power level history using data computed during said current transmission event.

10. A radiation power level control system for controlling transmission power level of a wireless user equipment (UE) device, said system comprising:
- a tracking component for maintaining a history of power data for said wireless UE device, said power data comprising data tracked over a time window relative to one or more variables on a per transmission event basis;
- a Specific Absorption Rate (SAR) determining module for determining one or more SAR values for said wireless UE device during a current transmission event involving said wireless UE device, wherein said SAR determining module is configured to use said history of power data if said current transmission event occurred within a predetermined duration from a last transmission event involving said wireless UE device; and
- an adjustment module configured to facilitate adjusting a transmit power level of said wireless UE device if at least one of said one or more SAR values exceeds a threshold.

11. The radiation power level control system of claim 10 wherein said adjustment module is further configured to update said history of power data using data computed during said current transmission event.

12. The radiation power level control system of claim 10 further comprising a notification module for providing a notification to a user of said wireless UE device engaged in said current transmission event.

13. The radiation power level control system of claim 10 wherein said current transmission event comprises at least one of a voice call, a data session and an uplink event involving said wireless UE device.

* * * * *